(12) United States Patent
Chatterjee et al.

(10) Patent No.: US 10,664,408 B1
(45) Date of Patent: May 26, 2020

(54) SYSTEMS AND METHODS FOR INTELLIGENTLY DISTRIBUTING DATA IN A NETWORK SCALABLE CLUSTER USING A CLUSTER VOLUME TABLE (CVT) IDENTIFYING OWNER STORAGE NODES FOR LOGICAL BLOCKS

(71) Applicant: Amzetta Technologies, LLC, Norcross, GA (US)

(72) Inventors: Paresh Chatterjee, Fremont, CA (US); Vijayarankan Muthirisavenugopal, Chennai (IN); Raghavan Sowrirajan, Fremont, CA (US); Shakeeb Kooriyattu Puthanpurayil, Chennai (IN)

(73) Assignee: Amzetta Technologies, LLC, Norcross, GA (US)

( * ) Notice: Subject to any disclaimer, the term of this patent is extended or adjusted under 35 U.S.C. 154(b) by 27 days.

(21) Appl. No.: 15/969,079

(22) Filed: May 2, 2018

Related U.S. Application Data

(60) Provisional application No. 62/500,036, filed on May 2, 2017.

(51) Int. Cl.
*G06F 12/10* (2016.01)
*G06F 12/06* (2006.01)
(Continued)

(52) U.S. Cl.
CPC .......... *G06F 12/1009* (2013.01); *G06F 12/06* (2013.01); *G06F 13/1668* (2013.01);
(Continued)

(58) Field of Classification Search
CPC ............. G06F 12/1209; G06F 13/1668; G06F 2212/1044; G06F 2212/657; G06F 12/1009; G06F 12/06; G06F 12/1072
See application file for complete search history.

(56) References Cited

U.S. PATENT DOCUMENTS

7,536,529 B1   5/2009   Chatterjee et al.
7,694,072 B2 * 4/2010   Nehse ................... G06F 3/0605
                                                    711/114
(Continued)

*Primary Examiner* — Glenn Gossage
(74) *Attorney, Agent, or Firm* — Meunier Carlin & Curfman LLC (57) ABSTRACT

Systems, methods, and computer-readable media for intelligent distribution of data in a storage cluster are described herein. An example method includes maintaining a cluster volume table (CVT) that stores information regarding data distribution of a volume across a plurality of storage nodes, and defining data distribution groups within the CVT. The CVT includes a plurality of entries, where each entry identifies an owner storage node for a respective logical block of the volume. Each data distribution group includes consecutive CVT entries. The method also includes receiving an input/output (I/O) operation directed to a region of the volume, identifying an owner storage node associated with the region of the volume using the CVT, and serving the I/O operation with at least one storage node of a data distribution group associated with the owner storage node. The I/O operation is served at a chunk-level granularity that is finer than a logical-block-level granularity of the volume. The at least one storage node that serves the I/O operation may be identified by performing a division and modulo operation. A modulus may equal the number of storage nodes in the data distribution group associated with the owner storage node. Data may be striped at the chunk-level granularity across the storage nodes in the data distribution group associated with the owner storage node.

20 Claims, 9 Drawing Sheets

(51) Int. Cl.
*G06F 12/1009* (2016.01)
*G06F 13/16* (2006.01)
*G06F 12/1072* (2016.01)

(52) U.S. Cl.
CPC .. *G06F 12/1072* (2013.01); *G06F 2212/1044* (2013.01); *G06F 2212/657* (2013.01)

(56) References Cited

U.S. PATENT DOCUMENTS

| | | | |
|---|---|---|---|
| 2013/0046892 A1* | 2/2013 | Otani | G06F 15/173 709/226 |
| 2015/0006846 A1* | 1/2015 | Youngworth | G06F 3/0689 711/216 |
| 2016/0018992 A1 | 1/2016 | Takamura et al. | |
| 2016/0026660 A1* | 1/2016 | Mukherjee | G06F 16/21 707/803 |
| 2016/0132523 A1 | 5/2016 | Traeger | |
| 2019/0220454 A1* | 7/2019 | Matsui | G06F 16/2272 |

* cited by examiner

SYSTEMS AND METHODS FOR INTELLIGENTLY DISTRIBUTING DATA IN A NETWORK SCALABLE CLUSTER USING A CLUSTER VOLUME TABLE (CVT) IDENTIFYING OWNER STORAGE NODES FOR LOGICAL BLOCKS

CROSS-REFERENCE TO RELATED APPLICATIONS

This application claims the benefit of U.S. provisional patent application No. 62/500,036, filed on May 2, 2017, and entitled "SYSTEMS AND METHODS FOR IMPLEMENTING A NETWORK SCALABLE CLUSTER DEVICE," the disclosure of which is expressly incorporated herein by reference in its entirety.

BACKGROUND

Scalability is a requirement in many data storage systems. Different types of storage systems provide diverse methods of seamless scalability through capacity expansion. In some storage systems, such as systems utilizing redundant array of inexpensive disk (RAID) controllers, it is often possible to add disk drives (or other types of mass storage devices) to a storage system while the system is in operation. In such a system, the RAID controller re-stripes existing data onto the new disk and makes the capacity of the other disks available for new input/output (I/O) operations. This methodology, known as "vertical capacity expansion," is common. However, this methodology has at least one drawback in that it only scales data storage capacity, without improving other performance factors such as the processing power, main memory, or bandwidth of the system.

In other data storage systems, it is possible to add capacity by "virtualization." In this type of system, multiple storage servers are utilized to field I/O operations independently, but are exposed to the initiator of the I/O operation as a single device, called a "storage cluster." Each storage server in a cluster is called a "storage node" or just a "node." When data storage capacity becomes low, a new server may be added as a new node in the data storage system. In addition to contributing increased storage capacity, the new storage node contributes other computing resources to the system, leading to true scalability. This methodology is known as "horizontal capacity expansion." Some storage systems support vertical expansion of individual nodes, as well as horizontal expansion by the addition of storage nodes.

In a horizontally federated storage system with multiple storage nodes, a volume resides across various storage nodes. The volume is distributed such that each node owns a particular region of the volume. For example, data is striped across multiple storage nodes in conventional horizontally federated storage systems in much the same way as data is striped across disks in RAID arrays. The granularity of striping across storage nodes is at the territory level. Territory level striping, however, may not be able to provide network utilization scaling for sequential I/O operations, i.e., it may not be possible to ensure that different I/O operations are fielded by different nodes. This is because a group of sequential I/O operations may be served by a single node, which results in the other nodes remaining passive. While decreasing the granularity of striping (e.g., to chunk level) may ensure that the sequential burst of I/O operations is served by different nodes, chunk level striping would result in a greater and possibly unmanageable amount of metadata.

SUMMARY

Systems and methods are described herein for providing a high-performance, efficient network scalable cluster device. The systems and methods provide an intelligent distribution of data among a plurality of storage nodes. The systems and methods also provide an intelligent initiator accessing the multiple paths to the target in a highly efficient manner.

An example computer-implemented method for intelligent distribution of data in a storage cluster is described herein. The method can include maintaining a cluster volume table (CVT) that stores information regarding data distribution of a volume across a plurality of storage nodes, and defining a plurality of data distribution groups within the CVT. The CVT can include a plurality of entries, where each of the entries identifies a respective owner storage node for a respective logical block of the volume. In addition, each of the data distribution groups can include a plurality of consecutive CVT entries. The method can also include receiving an input/output (I/O) operation directed to a region of the volume, identifying an owner storage node associated with the region of the volume, using the CVT, and serving the I/O operation with at least one storage node of a data distribution group associated with the owner storage node. The I/O operation can be served at a chunk-level granularity that is finer than a logical-block-level granularity of the volume.

Additionally, the method can include identifying the at least one storage node that serves the I/O operation by performing a division and modulo operation. Optionally, a modulus can equal the number of storage nodes in the data distribution group associated with the owner storage node.

Alternatively or additionally, serving the I/O operation with at least one storage node of a data distribution group associated with the owner storage node can include striping data at the chunk-level granularity across the storage nodes in the data distribution group associated with the owner storage node.

Alternatively or additionally, each of the data distribution groups includes entries identifying at least two different owner storage nodes.

Alternatively or additionally, a capacity of the volume can be a multiple of a capacity of a data distribution group. Alternatively or additionally, the capacity of the data distribution group can be less than a minimum volume size. For example, the capacity of the volume can optionally be a multiple of 1 GB. Optionally, the capacity of the data distribution group can be 128 MB.

Alternatively or additionally, each of the data distribution groups can have a number of CVT entries greater than a number of consecutive blocks that can be allocated to a single storage node.

Alternatively or additionally, the plurality of storage nodes can include at least two storage nodes having different capacities.

An example non-transitory computer-readable recording medium for intelligent distribution of data in a storage cluster is also described herein. The computer-readable medium can have computer-executable instructions stored thereon that, when executed by a processor of the storage system computer, cause the processor of the storage system computer to maintain a cluster volume table (CVT) that stores information regarding data distribution of a volume across a plurality of storage nodes, and define a plurality of data distribution groups within the CVT. The CVT can include a plurality of entries, where each of the entries identifies a respective owner storage node for a respective logical block of the volume. In addition, each of the data distribution groups can include a plurality of consecutive CVT entries. The computer-readable medium can also have computer-executable instructions stored thereon that, when executed by the processor of the storage system computer, cause the processor of the storage system computer to receive an input/output (I/O) operation directed to a region of the volume, identify an owner storage node associated with the region of the volume, using the CVT, and serve the I/O operation with at least one storage node of a data distribution group associated with the owner storage node. The I/O operation can be served at a chunk-level granularity that is finer than a logical-block-level granularity of the volume.

An example storage system computer for intelligent distribution of data in a storage cluster is also described herein. The storage system computer can include a processor and a memory operably coupled to the processor. The memory can have computer-executable instructions stored thereon that, when executed by the processor, cause the processor to maintain a cluster volume table (CVT) that stores information regarding data distribution of a volume across a plurality of storage nodes, and define a plurality of data distribution groups within the CVT. The CVT can include a plurality of entries, where each of the entries identifies a respective owner storage node for a respective logical block of the volume. In addition, each of the data distribution groups can include a plurality of consecutive CVT entries. The memory can also have computer-executable instructions stored thereon that, when executed by the processor, cause the processor to receive an input/output (I/O) operation directed to a region of the volume, identify an owner storage node associated with the region of the volume, using the CVT, and serve the I/O operation with at least one storage node of a data distribution group associated with the owner storage node. The I/O operation can be served at a chunk-level granularity that is finer than a logical-block-level granularity of the volume.

It should be understood that the above-described subject matter may also be implemented as a computer-controlled apparatus, a computer process, a computing system, or an article of manufacture, such as a computer-readable storage medium.

Other systems, methods, features and/or advantages will be or may become apparent to one with of ordinary skill in the art upon examination of the following drawings and detailed description. It is intended that all such additional systems, methods, features and/or advantages be included within this description and be protected by the accompanying claims.

BRIEF DESCRIPTION OF THE DRAWINGS

The components in the drawings are not necessarily to scale relative to each other. Like reference numerals designate corresponding parts throughout the several views.

DETAILED DESCRIPTION

Unless defined otherwise, all technical and scientific terms used herein have the same meaning as commonly understood by one of ordinary skill in the art. Methods and materials similar or equivalent to those described herein can be used in the practice or testing of the present disclosure. As used in the specification, and in the appended claims, the singular forms "a," "an," "the" include plural referents unless the context clearly dictates otherwise. The term "comprising" and variations thereof as used herein is used synonymously with the term "including" and variations thereof and are open, non-limiting terms. The terms "optional" or "optionally" used herein mean that the subsequently described feature, event or circumstance may or may not occur, and that the description includes instances where the feature, event or circumstance occurs and instances where it does not. Ranges may be expressed herein as from "about" one particular value, and/or to "about" another particular value. When such a range is expressed, an implementation of the disclosed subject matter includes from the one particular value and/or to the other particular value. Similarly, when values are expressed as approximations, by use of the antecedent "about," it will be understood that the particular value forms another implementation of the disclosed subject matter. It will be further understood that the endpoints of each of the ranges are significant both in relation to the other endpoint, and independently of the other endpoint. While implementations will be described for a network scalable storage cluster, it will become evident to those skilled in the art that the implementations are not limited thereto.

Figure 1:
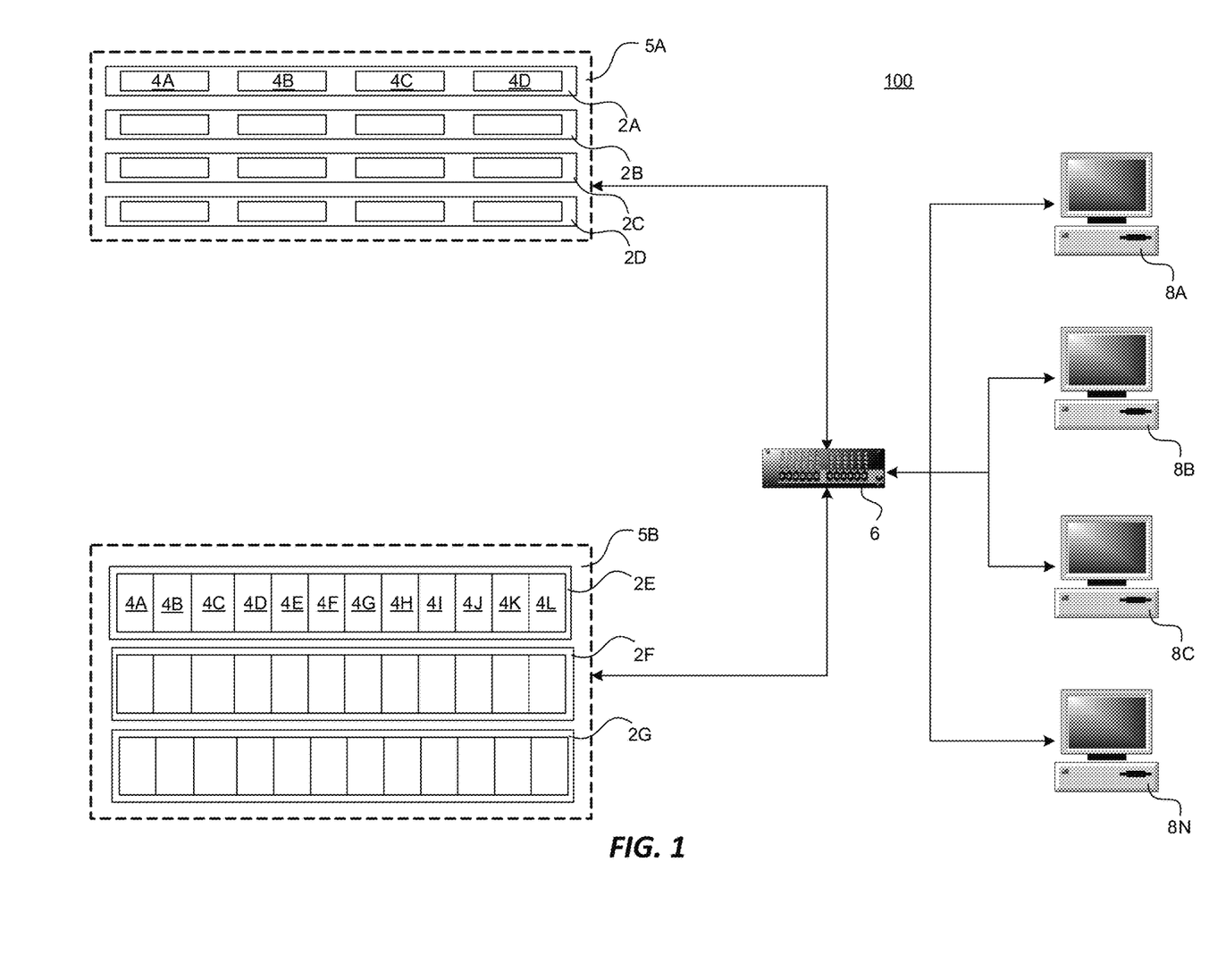
FIG. 1 is a computer architecture and network diagram showing aspects of a computer network and a storage server computer that provides an operating environment for embodiments of the disclosure presented herein.
Figure 2:
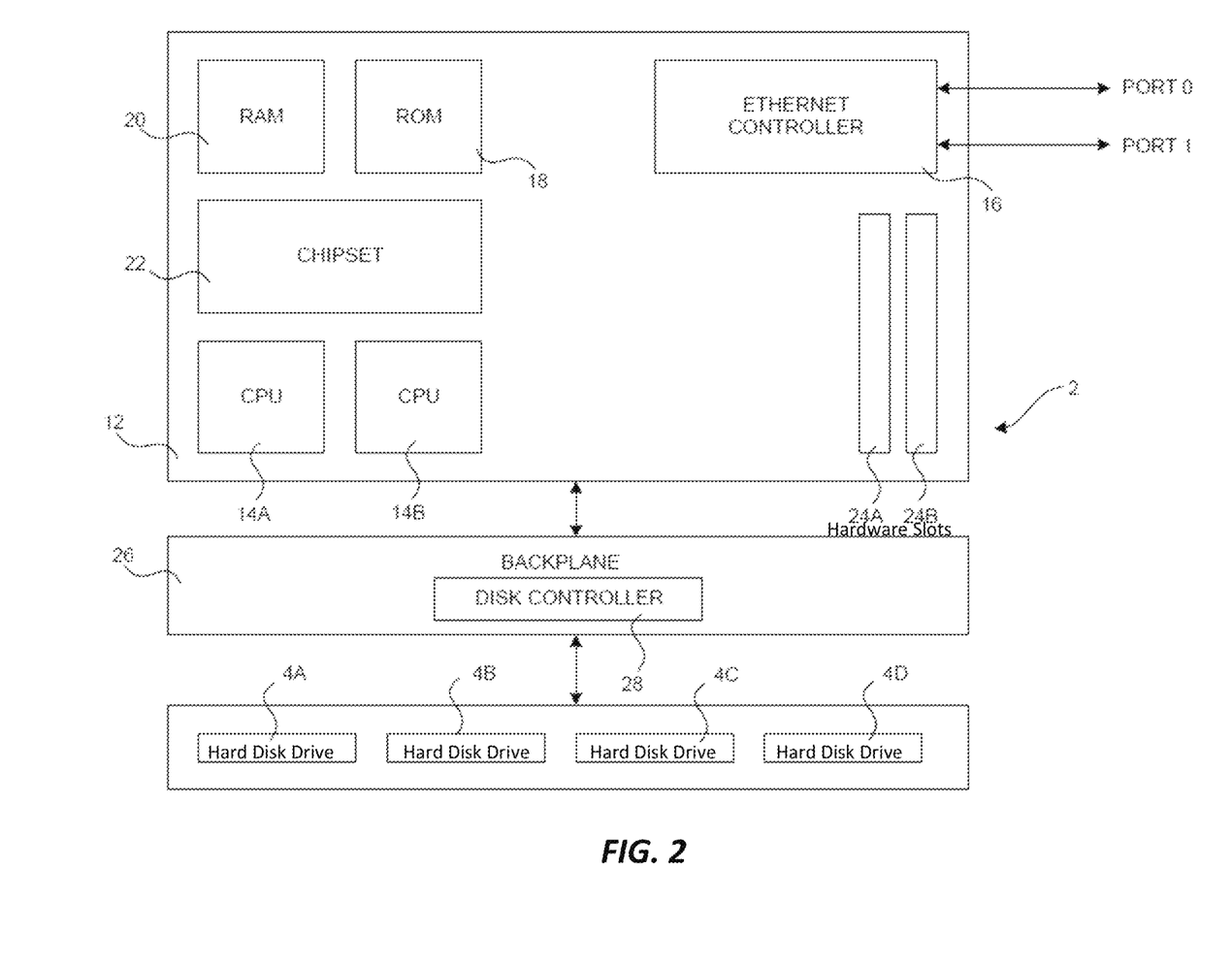
FIG. 2 is a computer architecture diagram illustrating aspects of the hardware of an illustrative storage server computer described herein.

FIGS. 1 and 2 and the following discussion are intended to provide a brief, general description of a suitable computing environment in which the embodiments described herein may be implemented. Generally, program modules include routines, programs, components, data structures, and other types of structures that perform particular tasks or implement particular abstract data types. Moreover, those skilled in the art will appreciate that the embodiments described herein may be practiced with other computer system configurations, including hand-held devices, multiprocessor systems, microprocessor-based or programmable consumer electronics, minicomputers, mainframe computers, and the like. The embodiments described herein may also be practiced in distributed computing environments where tasks are performed by remote processing devices that are linked through a communications network. In a distributed computing environment, program modules may be located in both local and remote memory storage devices. While the implementations presented herein will be described in the general context of program modules that execute in conjunction with an operating system on a computer system, those skilled in the art will recognize that they may also be implemented in combination with other program modules.

Turning now to FIG. 1, details will be provided regarding an illustrative operating environment for the implementations presented herein, as well as software components that provide the functionality described herein for implementing a network scalable storage cluster. In particular, FIG. 1 is a network architecture diagram showing a storage system 100 that includes several virtualized clusters 5A-5B. A virtualized cluster is a cluster of different storage nodes that together expose a single storage device. In the example storage system 100 shown in FIG. 1, the clusters 5A-5B (collectively, clusters 5) include storage nodes 2A-2G (also referred to herein as "storage server computer" or a "node" or "storage system computer", collectively nodes 2) that are operative to read and write data to one or more mass storage devices, such as hard disk drives. The cluster 5A includes the nodes 2A-2D and the cluster 5B includes the nodes 2E-2G. All of the nodes 2 in a cluster 5 can be physically housed in the same rack, located in the same building, or distributed over geographically diverse locations, such as various buildings, cities, or countries.

According to implementations, the nodes within a cluster may be housed in a one rack space unit storing up to four hard disk drives. For instance, the node 2A is a one rack space computing system that includes four hard disk drives 4A-4D (collectively, drives or disks 4). Alternatively, each node may be housed in a three rack space unit storing up to fifteen hard disk drives. For instance, the node 2E includes hard disk drives 4A-4L. Other types of enclosures may also be utilized that occupy more or fewer rack space units and that store fewer or more hard disk drives. In this regard, it should be appreciated that the type of storage enclosure and number of hard disk drives utilized is not generally significant to the implementation of the embodiments described herein. Any type of storage enclosure and virtually any number of hard disk drives or other types of mass storage devices may be utilized.

As shown in FIG. 1, multiple storage nodes may be configured together as a virtualized storage cluster. For instance, the nodes 2A-2D have been configured as a storage cluster 5A and the nodes 2E-2G have been configured as a storage cluster 5B. In this configuration, each of the storage nodes 2A-2G is utilized to handle I/O operations independently, but are exposed to the initiator of the I/O operation as a single device. It should be appreciated that a storage cluster may include any number of storage nodes. A virtualized cluster in which each node contains an independent processing unit, and in which each node can field I/Os independently (and route them according to the cluster layout) is called a horizontally virtualized or peer cluster. A cluster in which each node provides storage, but the processing and mapping is done completely or primarily in a single node, is called a vertically virtualized cluster.

As described below, data may be striped across a plurality of storage nodes. For instance, the cluster 5A may stripe data across the storage nodes 2A, 2B, 2C and 2D. The cluster 5B may similarly stripe data across the storage nodes 2E, 2F and 2G. Striping data across nodes generally ensures that different I/O operations are fielded by different nodes, thereby utilizing multiple nodes simultaneously, and that the same I/O operation is not split between multiple nodes. Striping the data in this manner provides a boost to random I/O performance without decreasing sequential I/O performance.

According to embodiments, each storage node 2A-2G includes one or more network ports operatively connected to a network switch 6 using appropriate network cabling. It should be appreciated that, according to embodiments of the invention, Ethernet or Gigabit Ethernet may be utilized. However, it should also be appreciated that other types of suitable physical connections may be utilized to form a network of which each storage node 2A-2G is a part. Through the use of the network ports and other appropriate network cabling and equipment, each node within a cluster is communicatively connected to the other nodes within the cluster. Many different types and number of connections may be made between the nodes of each cluster. Furthermore, each of the storage nodes 2A-2G need not be connected to the same switch 6. The storage nodes 2A-2G can be interconnected by any type of network or communication links, such as a local area network (LAN), a wireless area network (WAN), a metropolitan area network (MAN), a fiber ring, a fiber star, wireless, optical, satellite, or any other network technology, topology, protocol, or combination thereof.

Each cluster 5A-5B is also connected to a network switch 6. The network switch 6 is connected to one or more client computers or initiators 8A-8N (also referred to herein as "initiators", collectively initiators 8). It should be appreciated that other types of networking topologies may be utilized to interconnect the clients and the clusters 5A-5B. It should also be appreciated that the initiators 8A-8N may be connected to the same local area network (LAN) as the clusters 5A-5B or may be connected to the clusters 5A-5B via a distributed wide area network, such as the Internet. An appropriate protocol, such as the Internet Small Computer Systems Interface ("iSCSI") or Fiber Channel protocol may be utilized to enable the initiators 8A-8N to communicate with and utilize the various functions of the storage clusters 5A-5B over a wide area network such as the Internet. An appropriate protocol, such as iSCSI, Fiber Channel, or Serial Attached SCSI ("SAS"), is also used to enable the members of the storage cluster to communicate with each other. These two protocols need not be similar.

Examples of the drives or disks 4 may include hard drives, spinning disks, stationary media, non-volatile memories, or optically scanned media; each, or in combination, employing magnetic, capacitive, optical, semiconductor, electrical, quantum, dynamic, static, or any other data storage technology. The drives or disks 4 may use integrated drive electronics (IDE), advanced technology attachment (ATA), serial advanced technology attachment (SATA), parallel advanced technology attachment (PATA), small computer systems interface (SCSI), universal serial bus (USB), peripheral component interconnect (PCI), Firewire, or any other bus, link, connection, protocol, network, controller, or combination thereof for I/O transfers.

Referring now to FIG. 2, an illustrative computer hardware architecture for practicing various embodiments will now be described. In particular, FIG. 2 shows an illustrative computer architecture and implementation for each storage node 2. In particular, each storage node 2 includes a baseboard, or "motherboard 12," which is a printed circuit board to which a multitude of components or devices may be connected by way of a system bus or other electrical communication path. In one illustrative embodiment, these components include, without limitation, one or more central processing units (CPUs) 14A-14B, a network adapter, such as the Ethernet controller 16, a system memory, including a Read Only Memory 18 (ROM) and a Random Access Memory 20 (RAM), and other hardware for performing input and output, such as a video display adapter or a universal serial bus (USB) port, not all of which are illustrated in FIG. 2.

The motherboard 12 may also utilize a system board chipset 22 implementing one or more of the devices described herein. One or more hardware slots 24A-24B may also be provided for expandability, including the addition of a hardware RAID controller to the storage node 2. It should also be appreciated that, although not illustrated in FIG. 2, a RAID controller may also be embedded on the motherboard 12 or implemented in software by the storage node 2. It is also contemplated that the storage node 2 may include other components that are not explicitly shown in FIG. 2 or may include fewer components than illustrated in FIG. 2.

As described briefly above, the motherboard 12 utilizes a system bus to interconnect the various hardware components. The system bus utilized by the storage node 2 provides a two-way communication path for all components connected to it. The component that initiates a communication is referred to as a "master" component and the component to which the initial communication is sent is referred to as a "slave" component. A master component therefore issues an initial command to or requests information from a slave component. Each slave component is addressed, and thus communicatively accessible to the master component, using a particular slave address. Both master components and slave components are operable to transmit and receive communications over the system bus. Buses and the associated functionality of master-slave communications are well-known to those skilled in the art, and therefore not discussed in further detail herein.

As discussed briefly above, the system memory in the storage node 2 may include including a RAM 20 and a ROM 18. The ROM 18 may store a basic input/output system (BIOS) or Extensible Firmware Interface (EFI) compatible firmware that includes program code containing the basic routines that help to transfer information between elements within the storage node 2. As also described briefly above, the Ethernet controller 16 may be capable of connecting the local storage node 2 to the initiators 8A-8N via a network. Connections which may be made by the network adapter may include LAN or WAN connections. LAN and WAN networking environments are commonplace in offices, enterprise-wide computer networks, intranets, and the Internet. The CPUs 14A-14B utilized by the storage node 2 are standard central processing units that perform the arithmetic and logical operations necessary for the operation of the storage node 2. CPUs are well-known in the art, and therefore not described in further detail herein. A graphics adapter may or may not be utilized within the storage node 2 that enables the display of video data (i.e., text and/or graphics) on a display unit.

As shown in FIG. 2, the motherboard 12 is connected via a backplane 26 and disk controller 28 to one or more mass storage devices. The mass storage devices may comprise hard disk drives 4A-4D or other types of high capacity high speed storage. The disk controller 28 may interface with the hard disk drives 4A-4D through a serial advanced technology attachment (SATA) interface, a small computer system interface (SCSI), a fiber channel (FC) interface, a SAS interface, or other standard interface for physically connecting and transferring data between computers and physical storage devices. The mass storage devices may store an operating system suitable for controlling the operation of the storage node 2, such as the LINUX operating system. The mass storage devices may also store application programs and virtually any other type of data. It should be appreciated that the operating system comprises a set of programs that control operations of the storage node 2 and allocation of resources. The set of programs, inclusive of certain utility programs, may also provide a graphical user interface to a user. An application program is software that runs on top of the operating system software and uses computer resources made available through the operating system to perform application specific tasks desired by the user.

In some implementations, a storage server computer can include dual storage controllers (e.g., left canister (LC) and right canister (RC)), with each of the LC and RC being considered a storage node. Each individual storage controller (e.g., LC and RC) can include a motherboard (e.g., motherboard 12 of FIG. 2) including CPU, chipset, RAM, ROM, Ethernet controller, and/or hardware slots as described above. Each storage controller can be connected to the hard disk drives 4A-4D through a common backplane (e.g., backplane 26 of FIG. 2). Optionally, each storage controller can include a disk controller (e.g., disk controller 28 of FIG. 2) for communicating with the hard disk drives 4A-4D. In this case, a disk controller can be provided on the motherboard of each storage controller. In one embodiment, the physical and electrical structure of the common backplane may be based upon the storage bridge bay ("SBB") specification. The SBB specification defines mechanical, electrical, and low-level enclosure management requirements for a single enclosure that supports the connection of multiple storage controllers as well as multiple physical disks (e.g., hard disk drives 4A-4D) from a variety of hardware and system vendors. The SBB mid-plane provides the common backplane that allows multiple storage controllers to be connected to and communicate with the physical disks concurrently.

The mass storage devices and their associated computer-readable media, provide non-volatile storage for the storage node 2. Although the description of computer-readable media contained herein refers to a mass storage device, such as a hard disk or compact disk read-only memory (CD-ROM) drive, it should be appreciated by those skilled in the art that computer-readable media can be any available media that can be accessed by the local storage server. By way of example, and not limitation, computer-readable media may comprise computer storage media and communication media. Computer storage media includes volatile and non-volatile, removable and non-removable media implemented in any technology for storage of information such as computer-readable instructions, data structures, program modules or other data. Computer storage media includes, but is not limited to, RAM, ROM, erasable programmable read only memory (EPROM), electrically erasable programmable read only memory (EEPROM), flash memory or other solid state memory technology, CD-ROM, digital versatile disk (DVD), or other optical storage, magnetic cassettes, magnetic tape, magnetic disk storage or other magnetic storage devices, or any other medium which can be used to store the desired information and which can be accessed by the computer.

Systems and methods for intelligent distribution of data across a plurality of storage nodes of a cluster are described below. In particular, the systems and methods use a striping formula in addition to metadata tables such that performance scales linearly with the number of storage nodes in the storage cluster.

A cluster volume table (CVT) can be maintained for storing information about data distribution of a volume across a plurality of storage nodes. The CVT can be a byte array that contains information concerning the distribution of the volume across the storage nodes. The CVT can include a plurality of entries, where each of the entries identifies a respective owner storage node for a respective logical block (e.g., a territory) of the volume. For example, each of the entries can store 8 bits to identify the respective owner storage node number for a logical block of the volume. It should be understood that the size of each entry (e.g., 8 bits) is provided only as an example and that each entry can be more or less than 8 bits. Optionally, the granularity of the CVT can be logical-block-level granularity such as a territory (8 MB), i.e., territory-level granularity. Thus, each entry of the CVT can store the owner storage node number accounting for that volume territory. It should be understood that 8 MB territory-level granularity is provided only as an example and that a territory can be more or less than 8 MB. It should also be understood that the CVT is the metadata table storing information about the distribution of the volume across the storage nodes. Further, this disclosure contemplates that the CVT can be stored by a storage node (e.g., storage node 2 of FIG. 2).

Figure 3:
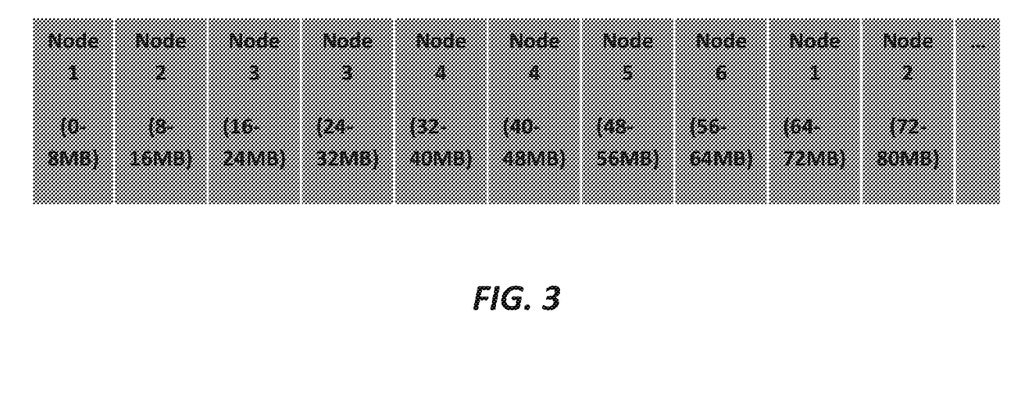
FIG. 3 is a block diagram illustrating a volume distributed at 8 megabyte (MB) granularity across a plurality of storage nodes (e.g., Nodes 1-6) according to an implementation described herein.

FIG. 3 is a block diagram illustrating a volume distributed at 8 MB granularity across a plurality of storage nodes (i.e., Nodes 1-6). The logical-block-level granularity is therefore 8 MB in the example shown in FIG. 3. As discussed above, each of the entries in the CVT can store the owner storage node number for a territory of the logical volume. For example, the CVT can be an array including a plurality of entries storing information identifying Node 1 as the owner storage node of territory 1 (i.e., 0-8 MB) and territory 9 (i.e., 64-72 MB), Node 2 as the owner storage node of territory 2 (i.e., 8-16 MB) and territory 10 (i.e., 72-80 MB), Node 3 as the owner storage node of territory 3 (i.e., 16-24 MB) and territory 4 (i.e., 24-32 MB), Node 4 as the owner storage node of territory 5 (i.e., 32-40 MB) and territory 6 (i.e., 40-48 MB), Node 5 as the owner storage node of territory 7 (i.e., 48-56 MB), Node 6 as the owner storage node of territory 8 (i.e., 56-64 MB), etc. It should be understood that the number of storage nodes (e.g., 6 storage nodes) and/or the granularity of data distribution (e.g., 8 MB) can be more or less than those shown in FIG. 3, which is provided as an example only.

Figure 4:
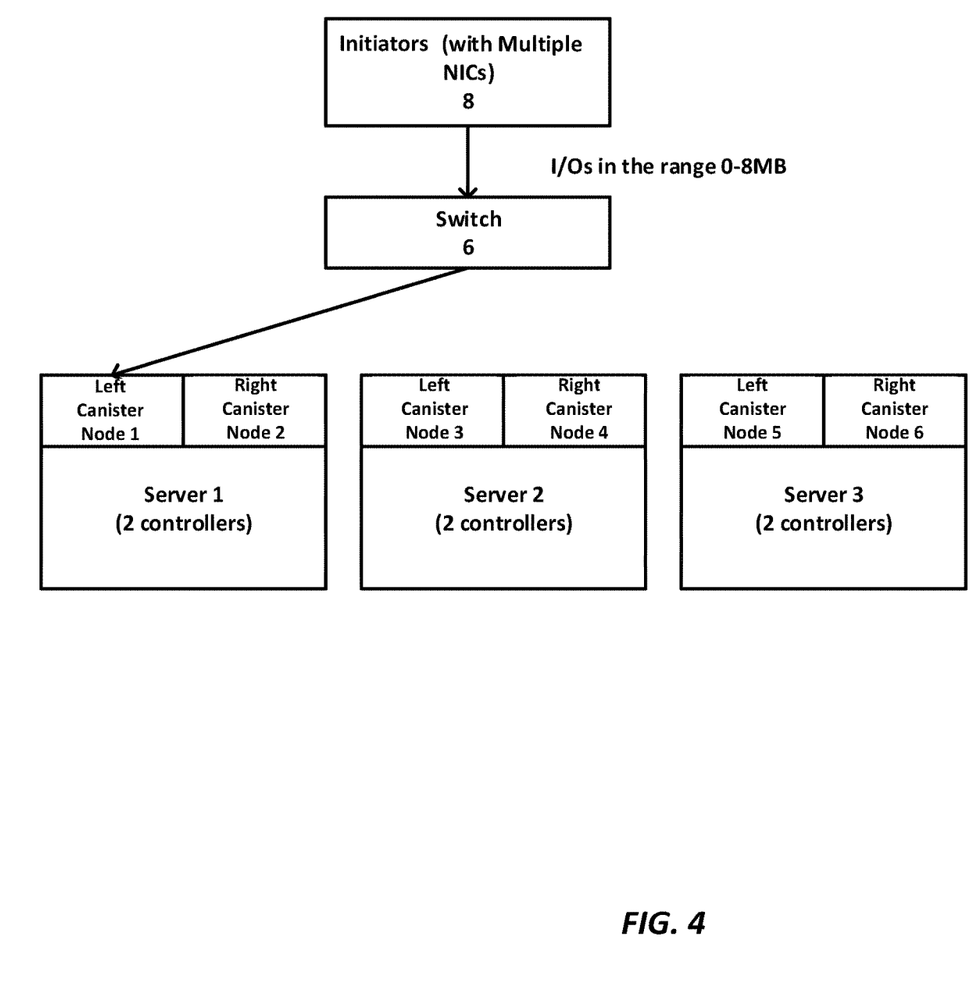
FIG. 4 is a block diagram illustrating a computing environment where I/O operations are owned at territory level (e.g., 8 MB) according to an implementation described herein.

Referring now to FIG. 4, a block diagram illustrating a computing environment where I/O operations are owned at territory-level (e.g., 8 MB) is shown. The computing environment includes initiators 8, network switch 6, and a plurality of storage nodes (e.g., Nodes 1-6). As described with regard to FIG. 1, the initiators 8 can be operably connected to the storage nodes Nodes 1-6 via the network switch 6. Additionally, a storage node can be a storage server computer as described with regard to FIG. 2. Alternatively or additionally, a storage node can include dual storage controllers (e.g., left canister (LC) and right canister (RC)).

Referring again to FIG. 4, the data is distributed at territory-level granularity (e.g., 8 MB) as shown in FIG. 3. Thus, when an I/O operation is directed to the region 0-8 MB (e.g., territory 1) as shown in FIG. 4, for example, the I/O operation is served by Node 1 if it lands on Node 1 or redirected to Node 1 for service if it lands on Nodes 2-6. The owner storage node associated with the region 0-8 MB (e.g., Node 1 in the example shown in FIG. 4) can be identified by referencing the CVT. Hence, it should be understood that a sequential burst of I/O operations directed to the region 0-8 MB (e.g., territory 1) would only be served by Node 1 in the example shown in FIG. 4. As discussed above, this does not result in network utilization scaling for sequential I/O operations since Nodes 2-6 would remain idle.

To provide a network scalable solution, the sequential burst of I/O operations directed to the region 0-8 MB (e.g., territory 1) would need to be served by a plurality of storage nodes in the storage cluster. One option is to distribute data across the plurality of storage nodes at a finer granularity. For example, data can be striped across the storage nodes at a granularity less than logical-block-level granularity such as territory-level granularity (e.g., less than 8 MB). It should be understood, however, that such a solution would require finer granularity metadata tables (e.g., tables with more entries), and any increase in granularity means increased memory and metadata storage requirements, which may be undesirable.

Figure 5:
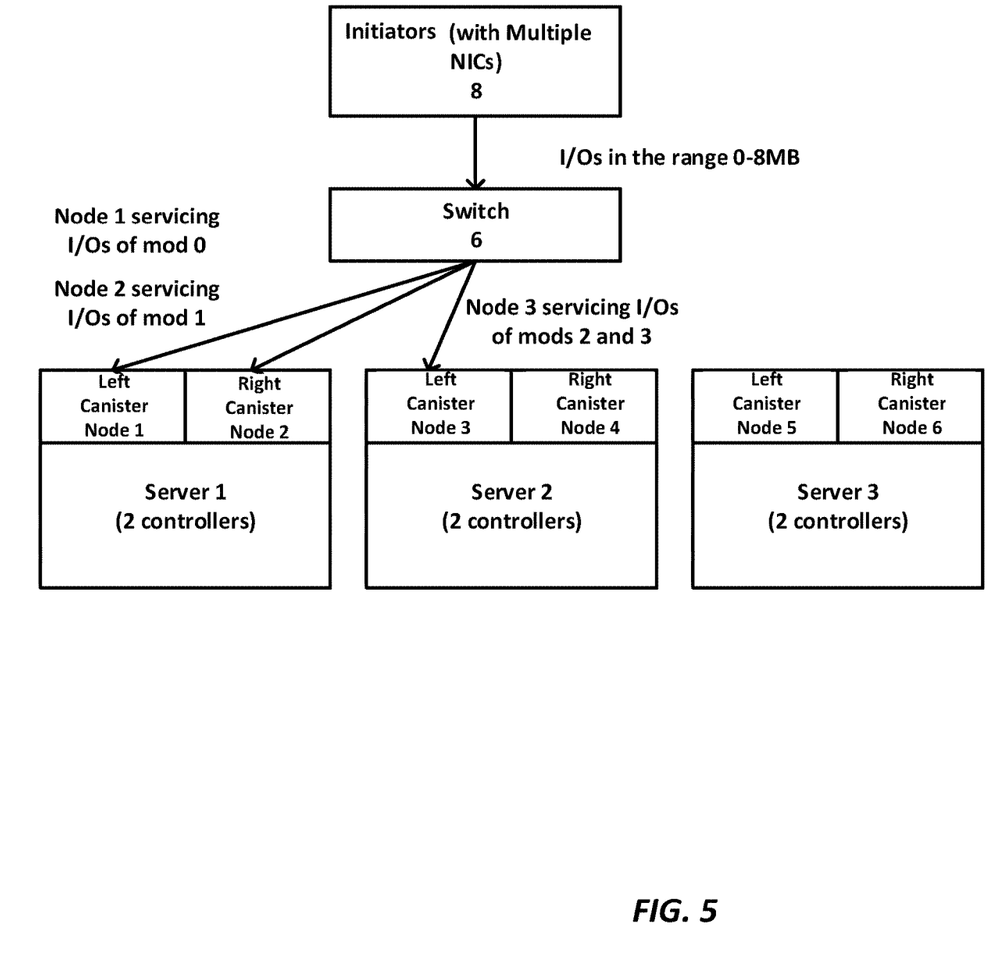
FIG. 5 is a block diagram illustrating a computing environment where I/O operations are owned at chunk level (e.g., a granularity less than territory level) according to an implementation described herein.

Referring now to FIG. 5, a block diagram illustrating a computing environment where I/O operations are owned at chunk level (e.g., a granularity less than territory level) is shown. An intelligent data distribution solution that provides for network scaling while at the same time does not result in increased memory and metadata storage requirements is described below. The computing environment includes initiators 8, network switch 6, and a plurality of storage nodes (e.g., Nodes 1-6). As described with regard to FIG. 1, the initiators 8 can be operably connected to the storage nodes Nodes 1-6 via the network switch 6. Additionally, a storage node can be a storage server computer as described above with regard to FIG. 2. Alternatively or additionally, a storage node can include dual storage controllers (e.g., left canister (LC) and right canister (RC)).

Figure 6:
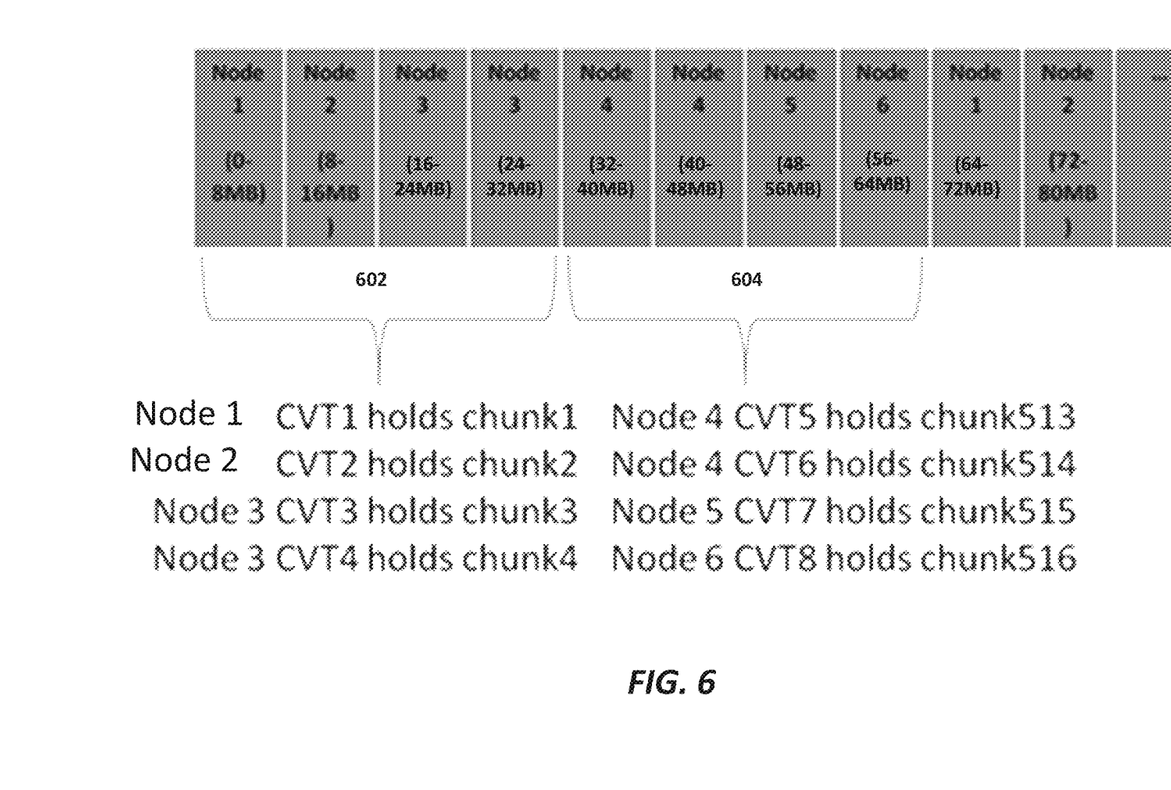
FIG. 6 is a block diagram illustrating a cluster volume table (CVT) according to an implementation described herein.

Referring now to FIG. 6, a block diagram illustrating a CVT for use with the computing environment of FIG. 5 is shown. As discussed above, each of the entries in the CVT can store the owner storage node number for a territory of the logical volume. For example, the CVT can be an array including a plurality of entries storing information identifying Node 1 as the owner storage node of territory 1 (i.e., 0-8 MB) and territory 9 (i.e., 64-72 MB), Node 2 as the owner storage node of territory 2 (i.e., 8-16 MB) and territory 10 (i.e., 72-80 MB), Node 3 as the owner storage node of territory 3 (i.e., 16-24 MB) and territory 4 (i.e., 24-32 MB), Node 4 as the owner storage node of territory 5 (i.e., 32-40 MB) and territory 6 (i.e., 40-48 MB), Node 5 as the owner storage node of territory 7 (i.e., 48-56 MB), Node 6 as the owner storage node of territory 8 (i.e., 56-64 MB), etc. It should be understood that the number of storage nodes (e.g., 6 storage nodes) and/or the granularity of data distribution (e.g., 8 MB) can be more or less than those shown in FIG. 6, which is provided as an example only. In addition, a plurality of data distribution groups can be defined within the CVT. Each of the data distribution groups can include a plurality of consecutive CVT entries. For example, a first data distribution group 602 can include the first four consecutive CVT entries (e.g., entries CVT1-4), and a second data distribution group 604 can include the next four consecutive CVT entries (e.g., entries CVT5-8). It should be understood that the number of consecutive CVT entries in a data distribution group can be more or less than 4, which is provided only as an example.

Using the CVT shown in FIG. 6 and a striping formula, data can be distributed across consecutive CVT blocks at a finer granularity (e.g., a granularity less than logical-block-level granularity). For example, chunk-level striping can be performed across the first data distribution group 602 shown in FIG. 6 such that the first 32 MB of the volume is striped at chunk-level granularity (e.g., 64 kilobyte (KB) granularity) across a block in Node 1, a block in Node 2, and two blocks of Node 3. Similarly, chunk-level striping can be performed across the second data distribution group 604 shown in FIG. 6 such that the next 32 MB of the volume is striped at chunk-level granularity (e.g., 64 KB granularity) across two blocks in Node 4, a block in Node 5, and a block in Node 6. Chunk-level striping can be performed using a division and modulo operation (e.g., striping formula) to determine the respective storage node in the data distribution group and offset for serving each chunk. For example, the division and modulo operation can be performed on the logical address of the volume. Optionally, a modulus can equal the number of storage nodes in the data distribution group associated with the owner storage node (e.g., 4 nodes as shown in FIG. 6). The granularity of data distribution can be 64 KB, which is finer than the granularity of the logical blocks (e.g., territories) of the volume. Additionally, because the division and modulo operation is used, there is no increase in memory and metadata storage requirements. The 64 KB distribution is contained in a greater distribution set of 32 MB. It should be understood that the greater distribution set can be more or less than 32 MB, e.g., 64 MB or 128 MB. It should also be understood that the chunk-level granularity can be more or less than 64 KB, which is provided only as an example. Thus, by using the CVT table in conjunction with the striping formula, it is possible to provide network scalability without increasing the memory and metadata storage requirements.

Referring again to FIG. 5, the data is distributed at granularity less than territory-level granularity (e.g., 64 KB). Thus, when an I/O operation is directed to the region 0-8 MB (e.g., territory 1) as shown in FIG. 6, for example, the owner storage node (e.g., Node 1) can be identified by referencing the CVT shown in FIG. 6. Then, the data distribution group associated with Node 1 (e.g., data distribution group 602) can be identified. The particular storage node in the data distribution group for serving the I/O operation and offset can be determined using a division and modulo operation, where the modulus is 4 (e.g., equal to the number of storage nodes in the data distribution group). In this example, Node 1 can serve I/O operations of mod 0, Node 2 can serve I/O operations of mod 1, and Node 3 can serve I/O operations of mod 2 and mod 3. Similarly, when an I/O operation is directed to the region 48-56 MB (e.g., territory 7) as shown in FIG. 6, for example, the owner storage node (e.g., Node 5) can be identified by referencing the CVT shown in FIG. 6. Then, the data distribution group associated with Node 5 (e.g., data distribution group 604) can be identified. The particular storage node in the data distribution group for serving the I/O operation and offset can be determined using a division and modulo operation, where the modulus is 4 (e.g., equal to the number of storage nodes in the data distribution group). In this example, Node 4 can serve I/O operations of mod 0 and mod 1, Node 5 can serve I/O operations of mod 2 and Node 6 can serve I/O operations of mod 3.

Example division and modulo operations are described below. In the example below, a chunk is 64 KB, a territory is 256 KB, and a segment is 1 MB. In the example, 1 MB of data is distributed across four storage nodes (e.g., Node 1-Node 4). It should be understood that the sizes of the chunk, territory, and/or segment are provided only as examples. For example, Volume V0's logical block addresses can be split as shown in Table 1 below.

TABLE 1

| V0 | |
|---|---|
| 0-256K | Node1 |
| 256K-512K | Node1 |
| 512K-768K | Node2 |
| 768K-1024K | Node3 |

Table 1 is the CVT in this example. Table 2 below shows how the chunks can be split across Nodes 1-4, as well as the physical mapping to the disks in Nodes 1-4. It should be understood that Table 2 shows only the first distribution group for I/O operations fired to a Volume logical block address (LBA) less than 1 MB. For I/O operations fired to Volume LBAs greater than 1 MB, the distribution offsets can be added accordingly.

TABLE 2

| Node view | Node1 | Node1 | Node2 | Node3 |
|---|---|---|---|---|
| Volume View | 0K-256K | 256K-512K | 512K-768K | 768K-1024K |
| Physical address location on local disk or drive | 2048K-2304K | 8192K-8448K | 16384K-16640K | 8192K-8448K |
| Chunk view | 1 | 2 | 3 | 4 |
| | 5 | 6 | 7 | 8 |
| | 9 | 10 | 11 | 12 |
| | 13 | 14 | 15 | 16 |

In this example, an I/O operation of 1 KB size comes to Volume LBA 769K. With reference to Table 1, it appears that the Volume LBA mapping points to Node 3. Based on chunk striping, however, Node 1 serves this I/O operation, which is matrix (4, 1) in the chunk view of Table 2. The volume LBA is used in the division and modulo operation. To determine the chunk number, the following calculation is performed: (769K+64K−1)/64K=13th chunk (e.g., division operation). To determine the Node servicing the 13th chunk, the following calculation is performed: 13%4=1 (e.g., modulo operation). The modulus is equal to the number of storage nodes in the distribution group. Therefore, this I/O operation lies in the 1st column or 1st 256K block in the 1 MB segment that points to Node 1 from Table 1 (CVT Table). The offset within the territory Node 1 in the 1 MB segment can be calculated as follows: (13+4−1)/4=4. Accordingly, the physical locations are not used for the calculations above. The physical location is used only at the last step, after determining the Node and the Chunk Offset, to calculate the actual sector offset to fire the I/O operation to the local disk or drive.

Figure 7:
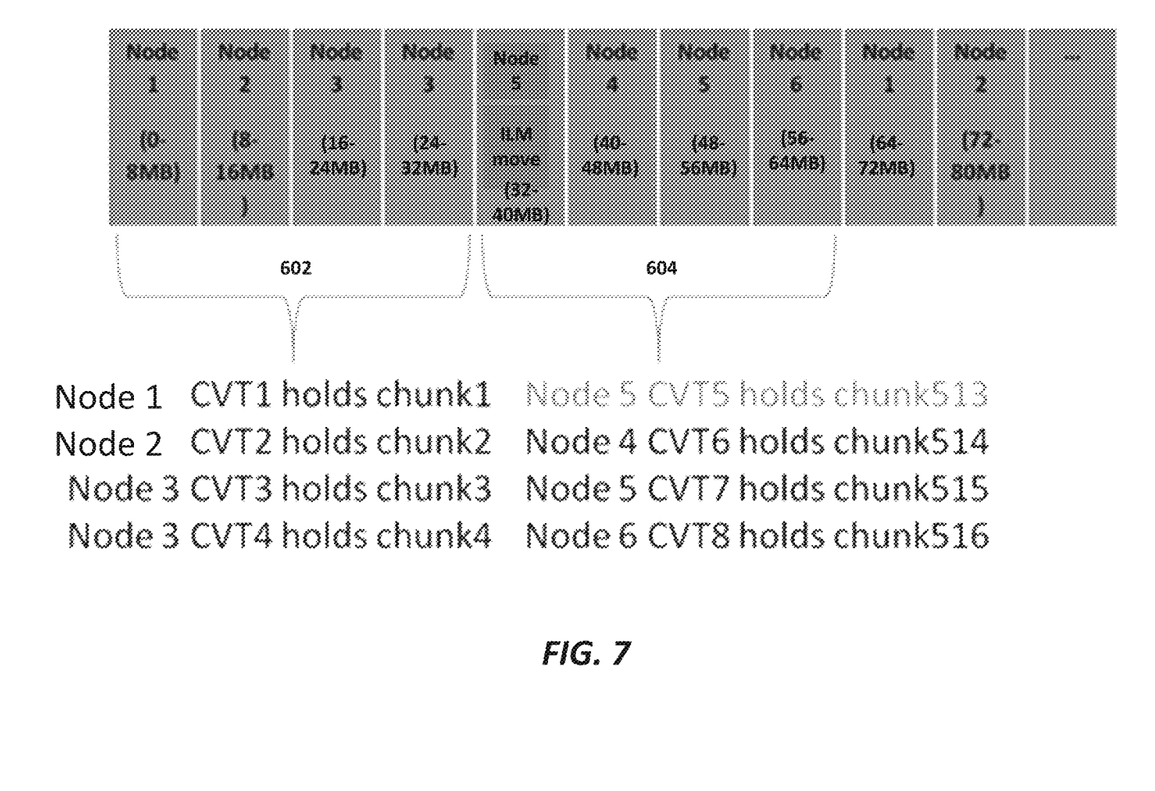
FIG. 7 is a block diagram illustrating a CVT change due to data movement according to an implementation described herein.

Referring now to FIG. 7, a block diagram illustrating another CVT is shown. The CVT shown in FIG. 7 illustrates how the chunk-level striping logic described above holds across CVT changes brought about by node/volume expansion or information lifecycle management (ILM)/container space management (CSM) or storage pool space management related data movements. In FIG. 7, territory 5 (i.e., 32-40 MB) moved from Node 4 to Node 5 as compared to FIG. 6. It should be understood that the underlying data moved as part of an ILM/CSM in this example. Based on the division and modulo operation, Node 1 can serve I/O operations of mod 0, Node 2 can serve I/O operations of mod 1, and Node 3 can serve I/O operations of mod 2 and mod 3. Similarly, Node 5 can serve I/O operations of mod 0 and mod 2, Node 4 can serve I/O operations of mod 1, and Node 6 can serve I/O operations of mod 3. Thus, because striping is performed across consecutive CVT blocks, the division and modulo operation (e.g., striping formula) ensures data integrity.

Figure 8:
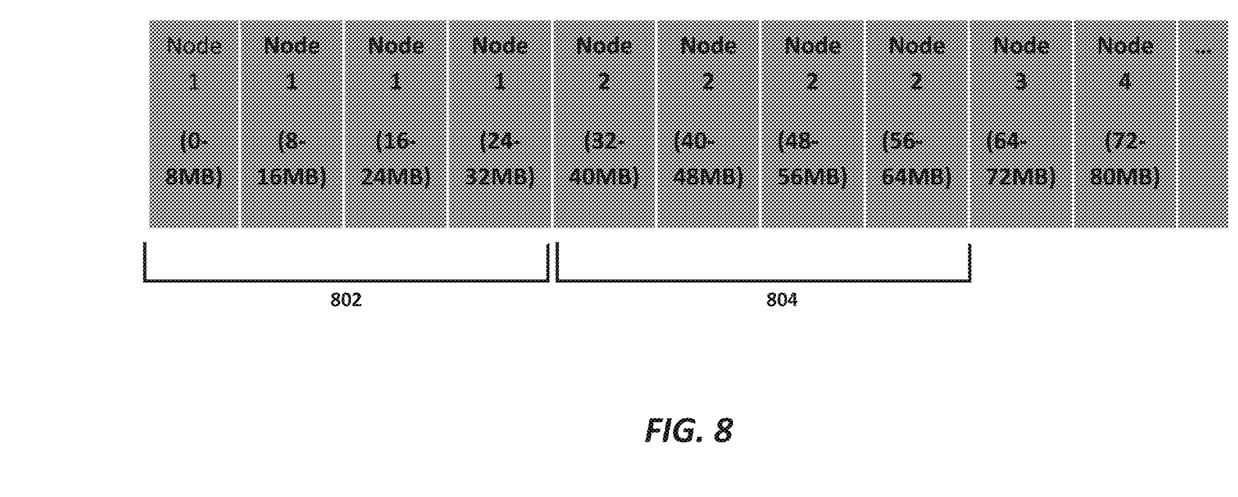
FIG. 8 is a block diagram illustrating a volume distributed at 8 MB granularity across a plurality of storage nodes (e.g., Nodes 1-4) where chunk level striping results in single storage node utilization by a data distribution group.

Referring now to FIG. 8, a block diagram illustrating a volume distributed at 8 MB granularity across a plurality of storage nodes (e.g., Nodes 1-4) where chunk level striping results in single storage node utilization is shown. As discussed above, each of the entries in the CVT can store the owner storage node number for a territory of the logical volume. For example, the CVT can be an array including a plurality of entries storing information identifying Node 1 as the owner storage node of territory 1 (i.e., 0-8 MB), territory 2 (i.e., 8-16 MB), territory 3 (i.e., 16-24 MB), and territory 4 (i.e., 24-32 MB); Node 2 as the owner storage node of territory 5 (i.e., 32-40 MB), territory 6 (i.e., 40-48 MB), territory 7 (i.e., 48-56 MB), and territory 8 (i.e., 56-64 MB); Node 3 as the owner storage node of territory 9 (i.e., 64-72 MB); and Node 4 as the owner storage node of territory 10 (i.e., 72-80 MB), etc. It should be understood that the number of storage nodes (e.g., 4 storage nodes) and/or the granularity of data distribution (e.g., 8 MB) can be more or less than those shown in FIG. 8, which is provided as an example only.

In addition, a plurality of data distribution groups can be defined within the CVT. For example, a first data distribution group 802 can include the first four consecutive CVT entries, and a second data distribution group 804 can include the next four consecutive CVT entries. It should be understood that the number of consecutive CVT entries can be more or less than 4, which is provided only as an example. In FIG. 8, the sizes or capacities of the storage nodes are varied such that the first two nodes (e.g., Nodes 1 and 2) are 4 times the size of the remaining nodes (e.g., Nodes 3 and 4). This disclosure contemplates that the storage nodes can include at least two storage nodes having different sizes or capacities. In this example, striping across 4 consecutive CVT entries (i.e., striping across Node 1 or Node 2) results in the data being placed within a single node itself.

For example, as shown in FIG. 8, the consecutive CVT blocks of the first and second data distribution groups 802 and 804, respectively, are not distributed across a plurality of nodes. All of the CVT entries for the first data distribution group 802 identify Node 1, and all of the CVT entries for the second data distribution group 804 identify Node 2. Accordingly, data distribution even at chunk-level (e.g., 64 KB) across the data distribution groups does not achieve network scaling because such data distribution results in single node utilization. This is in contract to FIGS. 6 and 7, where network scaling can be achieved by distributing data with 64 KB granularity across a plurality of CVT blocks.

Thus, it is desirable to increase the number of consecutive CVT entries in a data distribution group, which encompass the storage node(s) participating in the striping. In particular, to achieve network scaling, a data distribution group can include entries identifying at least two different storage nodes. While considering the number of consecutive CVT entries in a data distribution group, the following factors can be assessed.

Providing Network Scaling Across a Plurality of Storage Nodes.

An acceptable number of CVT entries for a data distribution group can be selected to ensure that the chunks are distributed across a plurality of storage nodes, even if one storage node has a higher distribution. This means that the number of CVT entries for a data distribution group must be greater than the number of consecutive blocks that could be allocated to a single storage node. It should also be understood that Serial Advanced Technology Attachment (SATA), Serial Attached SCSI (SAS), and solid state device (SSD) storage have different capacities that could result in the above mentioned scenario. It can be safely assumed that the capacity of any storage node will not be greater than 4 times the rest. Thus, striping across 16 consecutive CVT blocks can ensure that at least four storage nodes participate for each consecutive chunk sized (e.g., 64 KB) I/O operation across the greater distribution set of 128 MB (i.e., 16×8 MB). In other words, a data distribution group can include 16 consecutive CVT entries. It should be understood the number of consecutive CVT blocks, chunk size, and/or distribution set size can be more or less than those provided above, which are examples only.

Ensuring Volume Size is a Multiple of the Size of the Data Distribution Group.

It is desirable to avoid the case where a portion of the volume is supported by a lesser number of consecutive CVT blocks, while another portion(s) of the volume is supported by a different number of consecutive CVT blocks. For example, taking the above mentioned size of 128 MB as the stripe region size (e.g., the size of the greater distribution set), the volume size can be a multiple of 128 MB. Otherwise, for a last portion of the volume (e.g., modulo 128 MB), the number of CVT blocks serving the last portion of the volume would be different from the other regions, which would result in a more complex design. The data distribution group size can be less than the minimum volume size. Additionally, the volume size can be a multiple of a capacity of the data distribution group, e.g., the volume size can be divisible by the data distribution group size. In addition, since the cluster volumes can be created as a multiple of 1 GB, which is a multiple of 128 MB, the stripe region size of 128 MB satisfies both the requirements of network scaling and uniform CVT region based striping. In other words, a capacity of the volume can be a multiple of a capacity of a data distribution group. For example, the capacity of the volume can optionally be a multiple of 1 GB. Optionally, the capacity of the data distribution group can be 128 MB. It should be understood that volume size, chunk size, and/or distribution set size can be more or less than those provided above, which are examples only.

It should be appreciated that the logical operations described herein with respect to the various figures may be implemented (1) as a sequence of computer implemented acts or program modules (i.e., software) running on a computing device (e.g., the storage server computer described in FIG. 2), (2) as interconnected machine logic circuits or circuit modules (i.e., hardware) within the computing device and/or (3) a combination of software and hardware of the computing device. Thus, the logical operations discussed herein are not limited to any specific combination of hardware and software. The implementation is a matter of choice dependent on the performance and other requirements of the computing device. Accordingly, the logical operations described herein are referred to variously as operations, structural devices, acts, or modules. These operations, structural devices, acts and modules may be implemented in software, in firmware, in special purpose digital logic, and any combination thereof. It should also be appreciated that more or fewer operations may be performed than shown in the figures and described herein. These operations may also be performed in a different order than those described herein.

Figure 9:
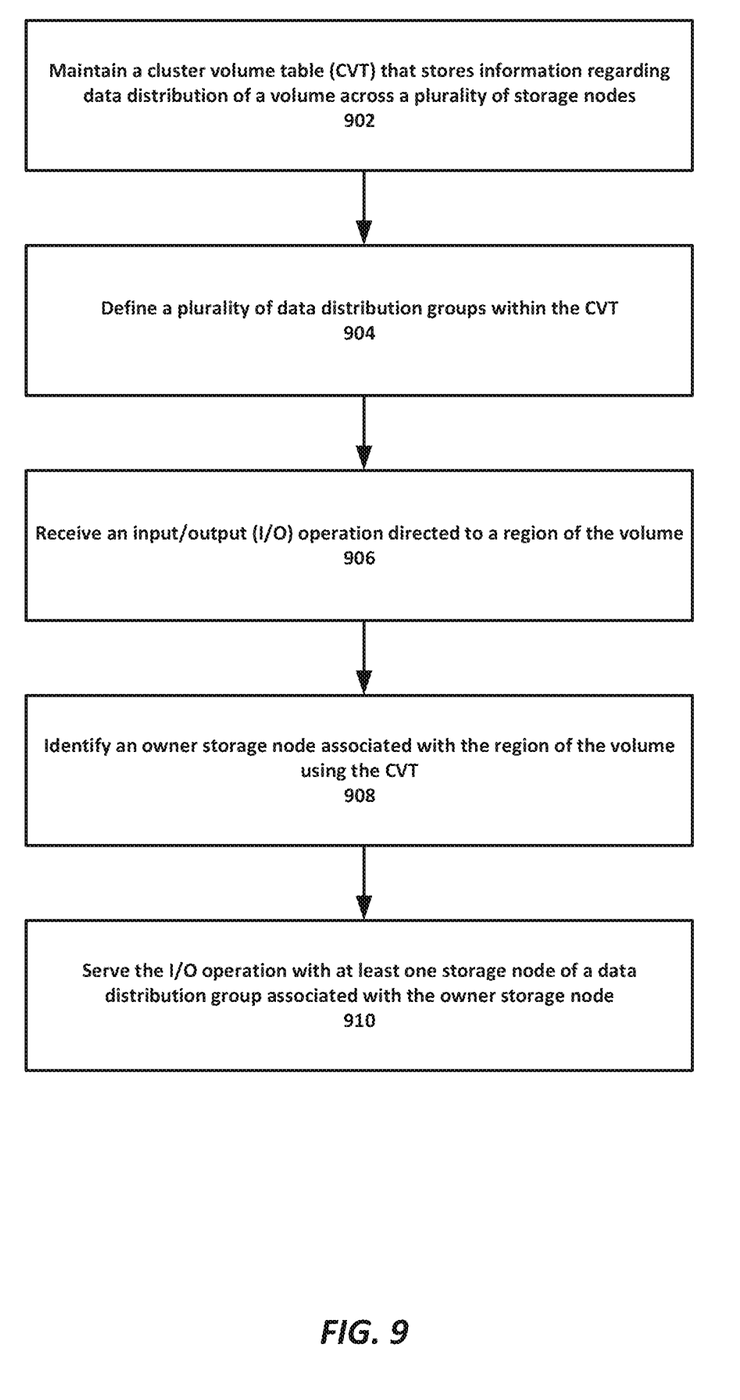
FIG. 9 is a flow diagram illustrating example operations for intelligent distribution of data in a storage cluster according to an implementation described herein.

Referring now to FIG. 9, a flow diagram illustrating example operations for intelligent distribution of data in a storage cluster are shown. At 902, a cluster volume table (CVT) that stores information regarding data distribution of a volume across a plurality of storage nodes is maintained. At 904, a plurality of data distribution groups are defined within the CVT. As described above, the CVT can include a plurality of entries, where each of the entries identifies a respective owner storage node for a respective logical block of the volume. Additionally, each of the data distribution groups can include a plurality of consecutive CVT entries. An example CVT with defined data distribution groups is described above with regard to FIGS. 6 and 7. At 906, an input/output (I/O) operation directed to a region of the volume is received. At 908, an owner storage node associated with the region of the volume is identified using the CVT. At 910, the I/O operation is served with at least one storage node of a data distribution group associated with the owner storage node. As described above, the I/O operation can be served at a chunk-level granularity (e.g., 64 KB) that is finer than a logical-block-level granularity (e.g., 8 MB) of the volume.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A computer-implemented method for intelligent distribution of data in a storage cluster, comprising:
    maintaining a cluster volume table (CVT) that stores information regarding data distribution of a volume across a plurality of storage nodes of the storage cluster, the CVT comprising a plurality of entries, wherein each of the entries identifies a respective owner storage node for a respective logical block of the volume;
    defining a plurality of data distribution groups within the CVT, wherein each of the data distribution groups comprises a plurality of consecutive CVT entries;
    receiving an input/output (I/O) operation directed to a region of the volume;
    using the CVT, identifying an owner storage node associated with the region of the volume; and
    serving the I/O operation with at least one storage node of a data distribution group associated with the identified owner storage node, wherein the I/O operation is served at a chunk-level granularity that is finer than a logical-block-level granularity of the volume.

2. The computer-implemented method of claim 1, further comprising identifying the at least one storage node that serves the I/O operation by performing a division and modulo operation on a volume logical block address.

3. The computer-implemented method of claim 2, wherein a modulus equals the number of storage nodes in the data distribution group associated with the identified owner storage node.

4. The computer-implemented method of claim 1, wherein serving the I/O operation with at least one storage node of a data distribution group associated with the identified owner storage node further comprises striping data at the chunk-level granularity across the storage nodes in the data distribution group associated with the identified owner storage node.

5. The computer-implemented method of claim 1, wherein each of the data distribution groups comprises entries identifying at least two different owner storage nodes.

6. The computer-implemented method of claim 1, wherein a capacity of the volume is a multiple of a capacity of a data distribution group.

7. The computer-implemented method of claim 1, wherein a capacity of a data distribution group is less than a minimum volume size.

8. The computer-implemented method of claim 1, wherein each of the data distribution groups comprises a number of CVT entries greater than a number of consecutive blocks that can be allocated to a single storage node.

9. The computer-implemented method of claim 1, wherein the plurality of storage nodes comprises at least two storage nodes having different capacities.

10. A non-transitory computer-readable recording medium having computer-executable instructions stored thereon for intelligent distribution of data in a storage cluster that, when executed by a processor of a storage system computer, cause the processor to:
    maintain a cluster volume table (CVT) that stores information regarding data distribution of a volume across a plurality of storage nodes of the storage cluster, the CVT comprising a plurality of entries, wherein each of the entries identifies a respective owner storage node for a respective logical block of the volume;
    define a plurality of data distribution groups within the CVT, wherein each of the data distribution groups comprises a plurality of consecutive CVT entries;
    receive an input/output (I/O) operation directed to a region of the volume;
    using the CVT, identify an owner storage node associated with the region of the volume; and
    serve the I/O operation with at least one storage node of a data distribution group associated with the identified owner storage node, wherein the I/O operation is served at a chunk-level granularity that is finer than a logical-block-level granularity of the volume.

11. The non-transitory computer-readable recording medium of claim 10, having further computer-executable instructions stored thereon that, when executed by the processor, cause the processor to identify the at least one storage node that serves the I/O operation by performing a division and modulo operation on a volume logical block address.

12. The non-transitory computer-readable recording medium of claim 11, wherein a modulus equals the number of storage nodes in the data distribution group associated with the identified owner storage node.

13. The non-transitory computer-readable recording medium of claim 10, wherein serving the I/O operation with at least one storage node of a data distribution group associated with the identified owner storage node further comprises striping data at the chunk-level granularity across the storage nodes in the data distribution group associated with the identified owner storage node.

14. The non-transitory computer-readable recording medium of claim 10, wherein each of the data distribution groups comprises entries identifying at least two different owner storage nodes.

15. The non-transitory computer-readable recording medium of claim 10, wherein a capacity of the volume is a multiple of a capacity of a data distribution group.

16. The non-transitory computer-readable recording medium of claim 10, wherein each of the data distribution groups comprises a number of CVT entries greater than a number of consecutive blocks that can be allocated to a single storage node.

17. The non-transitory computer-readable recording medium of claim 10, wherein the plurality of storage nodes comprises at least two storage nodes having different capacities.

18. A storage node for intelligent distribution of data in a storage cluster, the storage node comprising:
   a processor; and
   a memory operably coupled to the processor, wherein the memory has computer-executable instructions stored thereon that, when executed by the processor, cause the processor to:
   maintain a cluster volume table (CVT) that stores information regarding data distribution of a volume across a plurality of storage nodes of the storage cluster, the CVT comprising a plurality of entries, wherein each of the entries identifies a respective owner storage node for a respective logical block of the volume;
   define a plurality of data distribution groups within the CVT, wherein each of the data distribution groups comprises a plurality of consecutive CVT entries;
   receive an input/output (I/O) operation directed to a region of the volume;
   using the CVT, identify an owner storage node associated with the region of the volume; and
   serve the I/O operation with at least one storage node of a data distribution group associated with the identified owner storage node, wherein the I/O operation is served at a chunk-level granularity that is finer than a logical-block-level granularity of the volume.

19. The storage node of claim 18, wherein the memory has further computer-executable instructions stored thereon that, when executed by the processor, cause the processor to identify the at least one storage node that serves the I/O operation by performing a division and modulo operation on a volume logical block address.

20. The storage node of claim 19, wherein a modulus equals the number of storage nodes in the data distribution group associated with the identified owner storage node.

* * * * *